United States Patent
Tetsuka

(10) Patent No.: US 9,499,234 B2
(45) Date of Patent: Nov. 22, 2016

(54) BICYCLE COMPONENT CONTROL APPARATUS

(71) Applicant: Shimano Inc., Sakai, Osaka (JP)

(72) Inventor: Toshio Tetsuka, Osaka (JP)

(73) Assignee: Shimano Inc., Osaka (JP)

( * ) Notice: Subject to any disclaimer, the term of this patent is extended or adjusted under 35 U.S.C. 154(b) by 344 days.

(21) Appl. No.: 13/870,401

(22) Filed: Apr. 25, 2013

(65) Prior Publication Data

US 2014/0318306 A1 Oct. 30, 2014

(51) Int. Cl.
*B62M 25/08* (2006.01)

(52) U.S. Cl.
CPC ......... *B62M 25/08* (2013.01); *Y10T 74/20438* (2015.01)

(58) Field of Classification Search
CPC .... B62M 25/08; B62M 9/122; B62M 9/132; B62M 2025/045; B60T 11/24; F15B 7/003
See application file for complete search history.

(56) References Cited

U.S. PATENT DOCUMENTS

| | | | | |
|---|---|---|---|---|
| 3,742,777 | A * | 7/1973 | Mathauser | B62M 25/08 474/110 |
| RE30,758 | E * | 10/1981 | Lang | 474/80 |
| 4,587,103 | A * | 5/1986 | Benajam et al. | 422/67 |
| 4,683,854 | A * | 8/1987 | Goulet | F02D 41/30 123/198 D |
| 5,443,134 | A | 8/1995 | Gajek et al. | |
| 6,042,495 | A * | 3/2000 | Patterson | B62M 9/122 474/78 |
| 6,073,536 | A * | 6/2000 | Campbell | B62D 5/07 91/516 |
| 6,196,266 | B1 * | 3/2001 | Breda | F16K 11/0853 137/454.6 |
| 6,993,437 | B1 * | 1/2006 | Chadwick | G01V 9/02 702/45 |
| 7,032,475 | B2 | 4/2006 | Ichida et al. | |
| 8,056,467 | B2 | 11/2011 | Shahana | |
| 9,229,712 | B2 * | 1/2016 | Takamoto | B62J 1/06 |
| 2005/0075774 | A1 * | 4/2005 | Takamoto | B62K 23/04 701/51 |
| 2005/0187049 | A1 * | 8/2005 | Guderzo et al. | 474/70 |
| 2009/0325758 | A1 * | 12/2009 | Ferguson | 477/68 |
| 2010/0105522 | A1 * | 4/2010 | Hagelskamp | 477/138 |
| 2011/0320093 | A1 * | 12/2011 | Kitamura | 701/51 |

FOREIGN PATENT DOCUMENTS

| | | |
|---|---|---|
| DE | 39 38 454 A1 | 5/1991 |
| DE | 196 42 605 A1 | 4/1998 |
| DE | 10 2006 008 550 A1 | 9/2007 |

OTHER PUBLICATIONS

Roberti, Damiano ("Cartridge Valves Combining Multiple Functions into a Single Cavity", HydraForce Insider Blog. <on-line publication>Posted on Apr. 20, 2011. Retrived on May 4, 2016 from <URL: http://info.hydraforce.com/hydraforceinsiderblog/> ).*

* cited by examiner

*Primary Examiner* — John K Fristoe, Jr.
*Assistant Examiner* — Richard Drake
(74) *Attorney, Agent, or Firm* — Global IP Counselors

(57) ABSTRACT

A bicycle component control apparatus is configured to control at least one bicycle component. The bicycle component control apparatus basically comprises a user operating device, an electric actuating unit and a hydraulic unit. The electric actuating unit is controlled in response to operation of the user operating device. The hydraulic unit is fluidly connected to the at least one bicycle component so as to fluidly control the at least one bicycle component in response to actuation of the electric actuating unit.

14 Claims, 4 Drawing Sheets

BICYCLE COMPONENT CONTROL APPARATUS

BACKGROUND

Field of the Invention

This invention generally relates to a bicycle component control apparatus. More specifically, the present invention relates to a bicycle component control apparatus that hydraulic controls a bicycle component using an electric actuator.

Background Information

Traditionally, most bicycle components are operated by a control cable that transmits a force from a control device operated by a bicyclist. More recently, bicycle components have been proposed that are operated using fluid pressure from a fluid such as air, water, oil, etc. Most control devices for a hydraulically operated bicycle component includes an operating member that moves a piston in a fluid pressure cylinder so as to fluidly operate the hydraulically operated bicycle component. One example of such a hydraulically operated bicycle component is disclosed in U.S. Pat. No. 8,056,467 (assigned to Shimano Inc.).

SUMMARY

Generally, the present disclosure is directed to various features of a bicycle component control apparatus. In view of the state of the known technology, one object is to provide a bicycle component control apparatus that can easily and precisely adjust an operating state or position of a hydraulically operated bicycle component.

In accordance with a first aspect of the present invention, a bicycle component control apparatus is configured to control at least one bicycle component. The bicycle component control apparatus basically comprises a user operating device, an electric actuating unit and a hydraulic unit. The electric actuating unit is controlled in response to operation of the user operating device. The hydraulic unit is fluidly connected to the at least one bicycle component so as to fluidly control the at least one bicycle component in response to actuation of the electric actuating unit.

In accordance with a second aspect of the present invention, the bicycle component control apparatus according to the first aspect is configured so that the user operating member is electrically connected to the electric actuating unit by an electrical wire.

In accordance with a third aspect of the present invention, the bicycle component control apparatus according to the first aspect is configured so that the user operating device is electrically connected to the electric actuating unit by an electrical wireless connection.

In accordance with a fourth aspect of the present invention, the bicycle component control apparatus according to the first aspect is configured so that the hydraulic unit includes a master piston moving in response to actuation of the electric actuating unit.

In accordance with a fifth aspect of the present invention, the bicycle component control apparatus according to the fourth aspect further comprises a slave piston moving in response to movement of the master piston.

In accordance with a sixth aspect of the present invention, the bicycle component control apparatus according to the fifth aspect is configured so that the slave piston is arranged at the at least one bicycle component.

In accordance with a seventh aspect of the present invention, the bicycle component control apparatus according to the fifth aspect is configured so that the electric actuating unit includes an electric motor having an output shaft, and the master piston of the hydraulic unit is connected to the output shaft so that the master piston moves in response to rotation of the output shaft.

In accordance with an eighth aspect of the present invention, the bicycle component control apparatus according to the first aspect is configured so that the at least one bicycle component includes a plurality of bicycle components, and further comprises a valve unit that selectively connects the bicycle components to the hydraulic unit.

In accordance with a ninth aspect of the present invention, the bicycle component control apparatus according to the eighth aspect is configured so that the valve unit is configured to be electrically controlled.

In accordance with a tenth aspect of the present invention, the bicycle component control apparatus according to the first aspect is configured so that the plurality of bicycle components includes a front derailleur, a rear derailleur and a bicycle suspension device.

In accordance with an eleventh aspect of the present invention, the bicycle component control apparatus according to the first aspect is configured so that the at least one bicycle component includes a front derailleur.

In accordance with a twelfth aspect of the present invention, the bicycle component control apparatus according to the first aspect is configured so that the at least one bicycle component includes a rear derailleur.

In accordance with a thirteenth aspect of the present invention, the bicycle component control apparatus according to the first aspect is configured so that the at least one bicycle component includes a bicycle suspension device.

In accordance with a fourteenth aspect of the present invention, the bicycle component control apparatus according to the first aspect further comprises a sensing element arranged to detect a current position of the bicycle component.

In accordance with a fifteenth aspect of the present invention, the bicycle component control apparatus according to the fourteenth aspect further comprises a display operatively coupled to the sensing element to receive a detection signal of the sensing element and configured to display the current position of the at least one bicycle component.

Other objects, features, aspects and advantages of the disclosed bicycle component control apparatus will become apparent to those skilled in the art from the following detailed description, which, taken in conjunction with the annexed drawings, discloses preferred embodiments of the bicycle component control apparatus.

BRIEF DESCRIPTION OF THE DRAWINGS

Referring now to the attached drawings which form apart of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
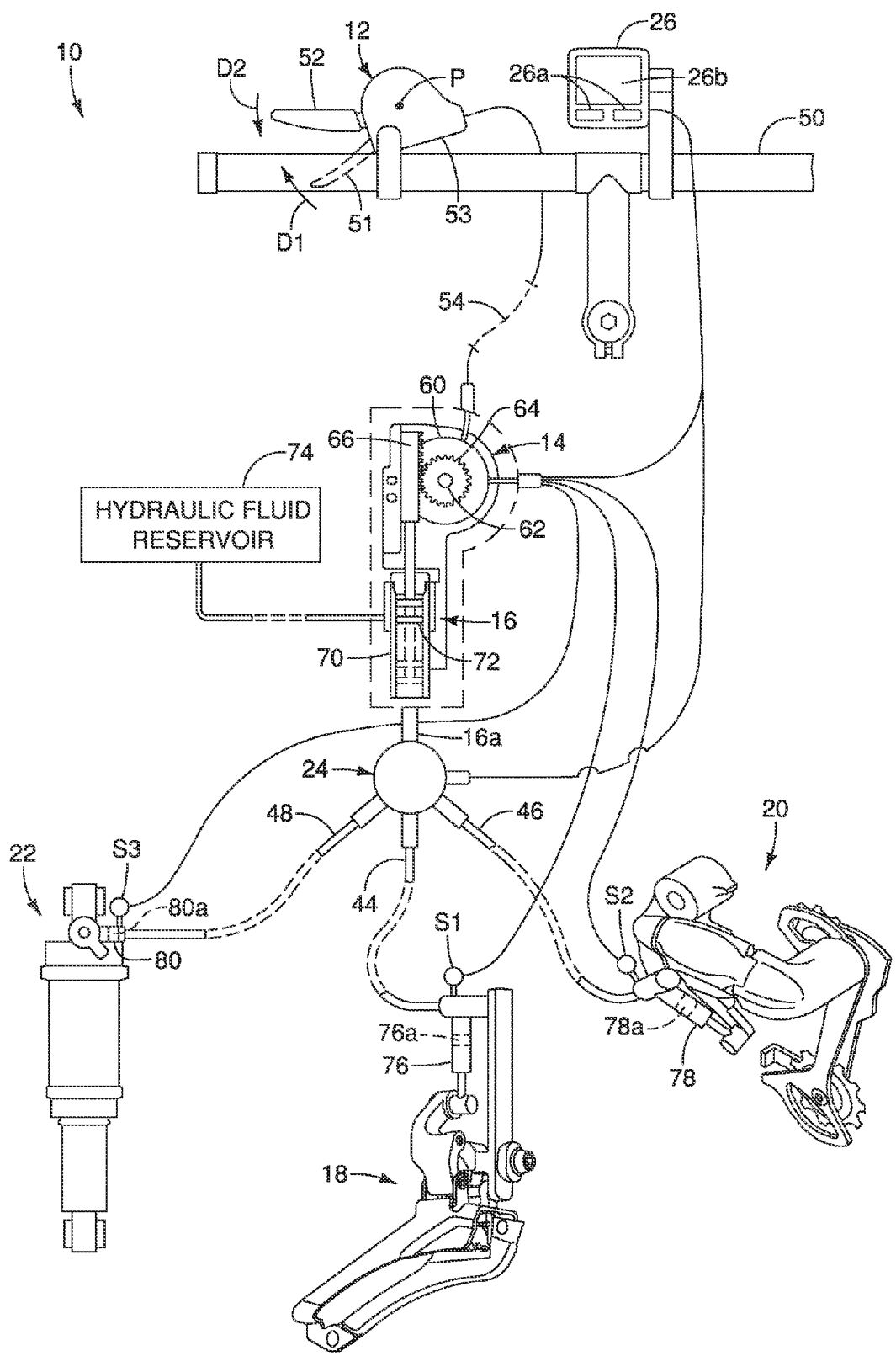
FIG. 1 is a schematic diagram of a bicycle component control apparatus having a single control device for operating an electric actuating unit that actuates a hydraulic unit to selectively operate three hydraulically operated components using in an electrically controlled valve accordance with a first embodiment.

Referring initially to FIG. 1, a bicycle component control apparatus 10 is illustrated in accordance with a first embodiment. The bicycle component control apparatus 10 is configured to control at least one bicycle component as explained later. In the first embodiment, the bicycle component control apparatus 10 basically comprises a user operating device 12, an electric actuating unit 14 and a hydraulic unit 16. Basically, the electric actuating unit 14 is controlled in response to operation of the user operating device 12 to operate the hydraulic unit 16, which in turn operates the at least one bicycle component. In the first embodiment, the at least one bicycle component of the bicycle component control apparatus 10 includes a plurality of bicycle components. The plurality of bicycle components includes a front derailleur 18, a rear derailleur 20 and a bicycle suspension device 22 (e.g., a rear shock absorber).

The front derailleur 18, the rear derailleur 20 and the bicycle suspension device 22 are three examples of hydraulically controlled bicycle components that can be controlled with the electric actuating unit 14 and the hydraulic unit 16 in responses to operation of the user operating device 12. The front derailleur 18, the rear derailleur 20 and the bicycle suspension device 22 are fluidly connected to the hydraulic unit and fluidly controlled in response to movement of the hydraulic unit 16 by the electric actuating unit 14.

Since the three hydraulically controlled bicycle components (i.e., the front derailleur 18, the rear derailleur 20 and the bicycle suspension device 22) are controlled by the single user operating device 12, preferably the bicycle component control apparatus 10 further comprises a valve unit 24 that selectively connects the bicycle components to the hydraulic unit 16. The valve unit 24 can be removed if only one bicycle component is being controlled. The valve unit 24 is preferably configured to be electrically controlled as explained below. For example, the bicycle component control apparatus 10 further comprises an electric control unit 26 (e.g., a cycle computer) that can be operated be the rider to select one of the front derailleur 18, the rear derailleur 20 and the bicycle suspension device 22 to be controlled by the user operating device 12. The electric control unit 26 includes a microprocessor, memory and other conventional structures of a conventional cycling computer. Since cycling computers are conventional devices that are well known, the electric control unit 26 will not be discussed and/or illustrated herein, except as modified to operate the bicycle component control apparatus 10. In particular, the electric control unit 26 is electrically connected to the electric actuating unit 14 and the valve unit 24 by electrical wires or cables. The electric control unit 26 receives various operating and status data from the electric actuating unit 14. The electric control unit 26 has user inputs 26a for operating the valve unit 24 to change the control or component operating position as explained below.

Preferably, as seen in FIG. 1, the bicycle component control apparatus 10 further comprises a first sensing element S1, a second sensing element S2 and a third sensing element S3. The first sensing element S1 is arranged to detect a current position (e.g., a current gear position) of the front derailleur 18 (one of the bicycle components). The second sensing element S2 is arranged to detect a current position (e.g., a current gear position") of the rear derailleur 20 (one of the bicycle components). The third sensing element S3 is arranged to detect a current position (e.g., a current stiffness position) of the bicycle suspension device 22 (one of the bicycle components).

Figure 5:
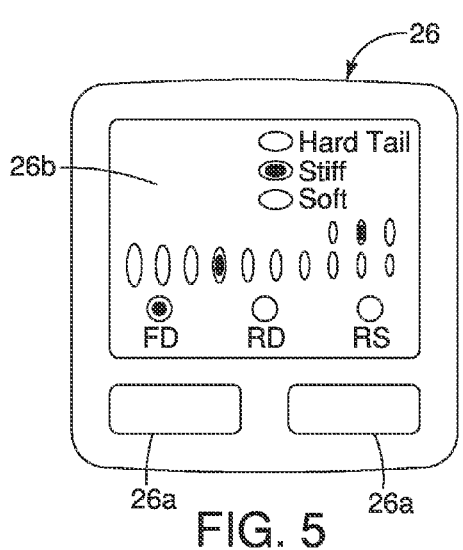
FIG. 5 is an enlarged top plan view of a cycle computer having a display that displays various status information of bicycle component control apparatus to a rider.

As seen in FIGS. 1 and 5, the bicycle component control apparatus 10 further comprises a display 26b, which is a part of the electric control unit 26 in the illustrated embodiment. Of course, it will be apparent from this disclosure that the display 26b can be a separate member from the electric control unit 26 as needed and/or desired. The display 26b is electrically and operatively coupled to the sensing elements S1, S2 and S3 to receive detection signals of the sensing elements S1, S2 and S3. As seen in FIG. 5, the display 26b is configured to display the current position of the at least one bicycle component. For example, the display 26b can graphically display a front and rear gears with different sizes of ovals (e.g., three the front gears and ten rear gears are illustrated) to indicate the current positions of the front derailleur 18 and the rear derailleur 20. The display 26b can display the various stiffness settings of the bicycle suspension device 22 (e.g., Hard Tail, Stiff and Soft are illustrated). Moreover, the display 26b can display the current component operating position (e.g., FD for the front derailleur 18, RD for the front derailleur 18, and RS for the bicycle suspension device 22) of the valve unit 24.

Figure 2:
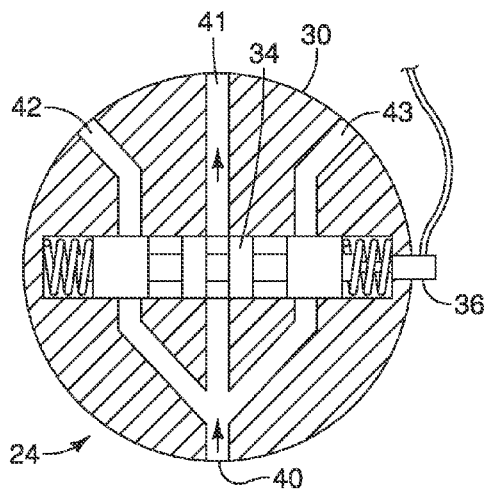
FIG. 2 is a simplified cross sectional view of an electrically controlled three-way output valve in a first component operating position to permit selective adjustment of first one of the hydraulically operated components (e.g., the front derailleur in the first illustrated embodiment)
Figure 3:
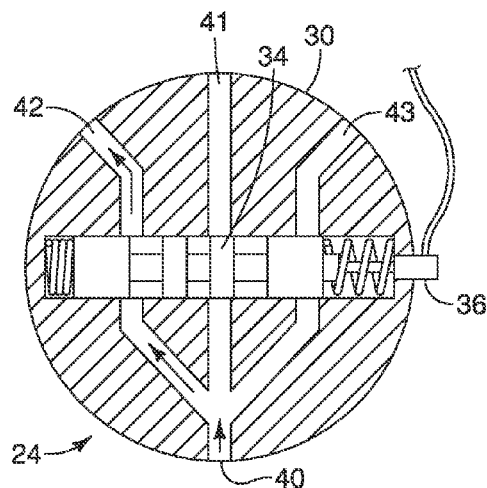
FIG. 3 is a simplified cross sectional view of an electrically controlled three-way output valve in a second component operating position to permit selective adjustment of a second one of the hydraulically operated components (e.g., the rear derailleur in the first illustrated embodiment)
Figure 4:
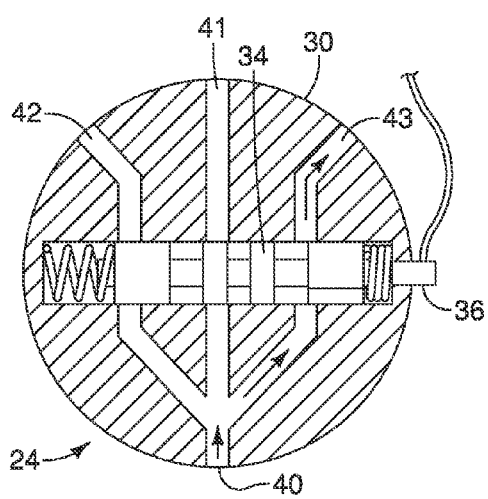
FIG. 4 is a simplified cross sectional view of an electrically controlled three-way output valve in a third component operating position to permit selective adjustment of a third one of the hydraulically operated components (e.g., the rear shock absorber in the first illustrated embodiment)

As seen in FIGS. 2 to 4, in the first embodiment, the valve unit 24 is a three-way value having a housing 32, a piston 34 and a solenoid actuator 36. The solenoid actuator 36 moves the piston 34 to one of three different control or component operating positions. As seen in FIGS. 2 to 4, the valve unit 24 has an inlet 40 that is fluidly connected to an outlet 16a of the hydraulic unit 16 as explained below. The valve unit 24 has a first outlet 41, a second outlet 42 and a third outlet 43. The first outlet 41 is fluidly connected to the front derailleur 18 by a hydraulic hose 44 for selectively supplying hydraulic fluid (e.g., mineral oil) to the front derailleur 18. The second outlet 42 is fluidly connected to the rear derailleur 20 by a hydraulic hose 46 for selectively supplying hydraulic fluid to the rear derailleur 20. The third outlet 43 is fluidly connected to the bicycle suspension device 22 by a hydraulic hose 48 for selectively supplying hydraulic fluid to the bicycle suspension device 22.

As seen in FIG. 2, when the piston 34 is in a first component operating position, the inlet 40 is fluidly connected to the first outlet 41 to permit selective adjustment of a first one of the hydraulically operated components (e.g., the front derailleur 18 in the first illustrated embodiment). As seen in FIG. 3, when the piston 34 is in a second component operating position, the inlet 40 is fluidly connected to the second outlet 42 to permit selective adjustment of a second one of the hydraulically operated components (e.g., the rear derailleur 20 in the first illustrated embodiment). As seen in FIG. 4, when the piston 34 is in a third component operating position, the inlet 40 is fluidly connected to the third outlet 43 to permit selective adjustment of a third one of the hydraulically operated components (e.g., the bicycle suspension device 22 in the first illustrated embodiment).

As seen in FIG. 1, in the first embodiment, the user operating device 12 can be mounted on a handlebar 50, as seen in FIG. 1, or any other suitable location of the bicycle. In this embodiment, the user operating device 12 is used to selectively operate each of the front derailleur 18, the rear derailleur 20 and the bicycle suspension device 22. The user operating device 12 can have a variety of configurations. Here, in the first embodiment of FIG. 1, the user operating device 12 includes a first operating lever 51 and a second operating lever 52 that are movably mounted to a housing 53. The first operating lever 51 is a trigger lever that is pivoted in a first direction D1 about a pivot axis P to output a first control signal. The second operating lever 52 is a trigger lever that is pivoted in a second direction D2 about the pivot axis P to output a second control signal. Of course, alternatively, it will be apparent from this disclosure that the user operating device 12 can one or more buttons or a single lever for operating the electric actuating unit 14. The user operating device 12 is electrically connected to the electric actuating unit 14 by an electrical wire 54 to send the first and second control signals to the electric actuating unit 14. The term "control signal" as used herein can refer a command that is received by a microcomputer or the like, or can refer merely electrical current. For example, the first and second operating levers 51 and 52 can merely operate a switch that opens and closes an electrical path that supplies to electricity to the electric actuating unit 14.

Here, in the first embodiment of FIG. 1, the electric actuating unit 14 includes an electric motor 60 having an output shaft 62. The electric actuating unit 14 preferably includes a microprocessor, memory, a motor driver and other conventional structures to control the operation of the electric motor 60 to obtain the desired amount of rotation of the output shaft 62 to properly adjust the bicycle component (i.e., the front derailleur 18, the rear derailleur 20 or the bicycle suspension device 22). The electric motor 60 is a reversible electric motor.

The electric motor 60 rotates the output shaft 62 in a first rotational direction when the first operating lever 51 is operated from a rest position to an operated position. The electric motor 60 rotates the output shaft 62 in a second rotational direction, which is opposite to the first rotational direction, when the second operating lever 52 is operated from a rest position to an operated position. Thus, the electric actuating unit 14 is controlled in response to operation of the first and second operating levers 51 and 52 (i.e., user operating members) of the user operating device 12.

The electric actuating unit 14 also has a drive train that covers rotational movement of the output shaft 62 to linear movement to operate the hydraulic unit 16. Here, the drive train has a pinion or spur gear 64 and a gear rack 66. The spur gear 64 is fixedly mounted to the output shaft 62 to rotate therewith. The teeth of the spur gear 64 are engaged with the teeth of the gear rack 66, which is slidably mounted to a housing structure of the electric actuating unit 14. Thus, rotation of the output shaft 62 together with the spur gear 64 moves the gear rack 66 linearly.

As schematically illustrated in FIG. 1, the hydraulic unit 16 has a housing 70 that is integrally formed with the electric actuating unit 14. The hydraulic unit 16 includes a master piston 72 that moves in response to actuation of the electric actuating unit 14. The master piston 72 is fixed to the gear rack 66 to move therewith. Thus, the master piston 72 of the hydraulic unit 16 is connected to the output shaft 62 via the spur gear 64 and the gear rack 66 so that the master piston 72 moves in response to rotation of the output shaft 62. The amount of movement of the master piston 72 will determine the amount of operation of the bicycle component (i.e., the front derailleur 18, the rear derailleur 20 or the bicycle suspension device 22) in the illustrated embodiment). The master piston 72 of the hydraulic unit 16 is movably operated by the electric actuating unit 14 between at least two different positions. The hydraulic unit 16 is provided with a hydraulic fluid reservoir 74 for supply hydraulic fluid to the master cylinder in conventional manner. The hydraulic fluid reservoir 74 can be integrally formed with the housing 70, or can be a separate unit that is fluidly connected by a hydraulic hose.

A slave piston moves in response to movement of the master piston 72. In particular, each of the bicycle components (i.e., the front derailleur 18, the rear derailleur 20 or the bicycle suspension device 22) is preferably provided with a slave cylinder 76, 78 or 80 with a slave piston 76a, 78a or 80a, respectively. The slave cylinder 76 and the slave piston 76a are arranged at the front derailleur 18 (the at least one bicycle component) to hydraulically operate the front derailleur 18 in a conventional manner. The slave cylinder 78 and the slave piston 78a are arranged at the rear derailleur 20 to hydraulically operate the rear derailleur 20 in a conventional manner. The slave cylinder 80 and the slave piston 80a are arranged at the rear bicycle suspension device 22 (one of the bicycle components) to hydraulically operate the bicycle suspension device 22 in a conventional manner.

Each of the bicycle components are configured to maintain an initial position of a moving member (e.g. a chain guide for the front derailleur 18 and the rear derailleur 20) by using a biasing member (not shown). When the master piston 72 moves toward a retracted position, which is opposite to the outlet 16a for the master cylinder 72, the moving member moves toward the initial position and then the fluid flows from the corresponding slave piston toward the master cylinder 72.

Figure 6:
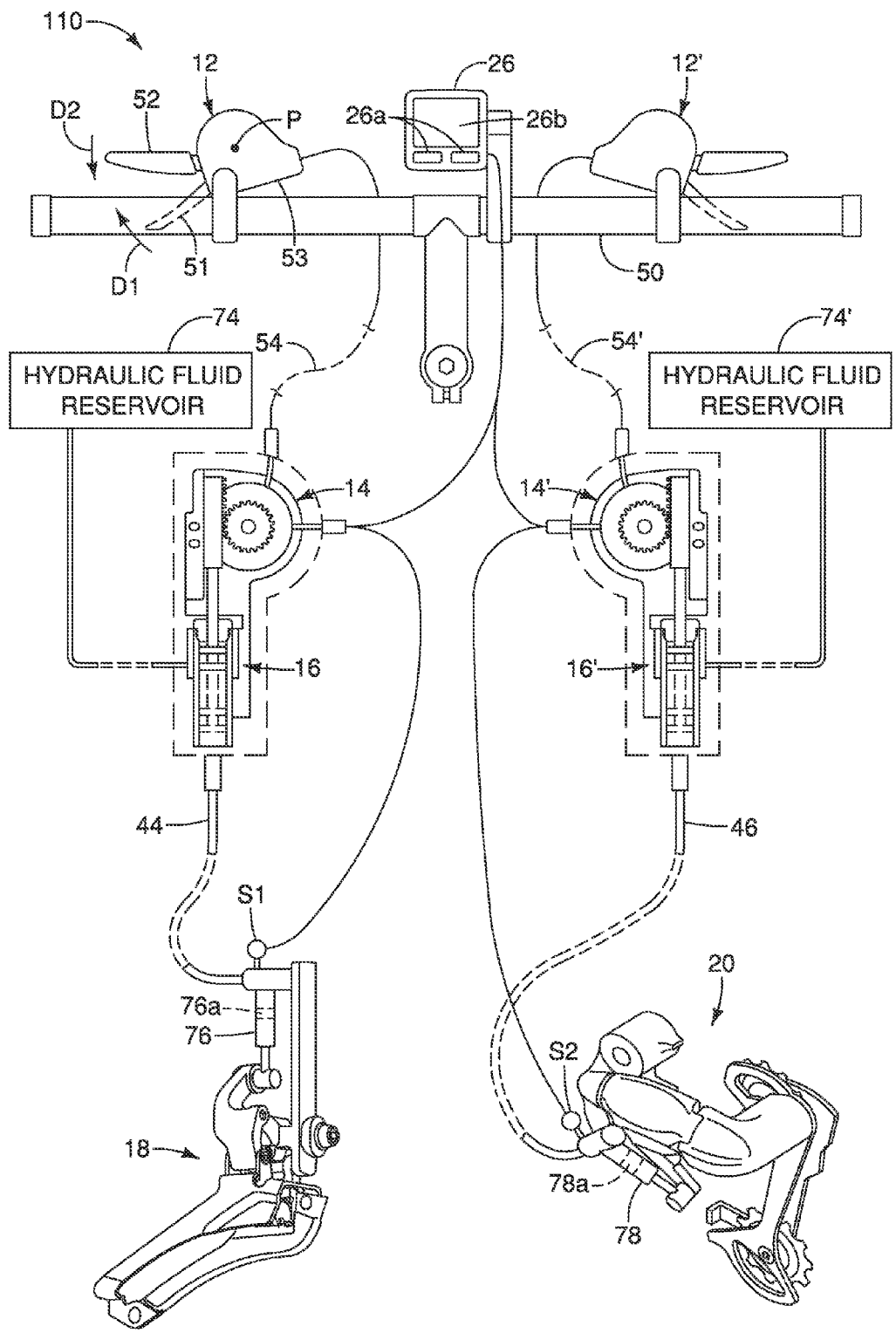
FIG. 6 is a schematic diagram illustrating two separate control devices that each operates a hydraulic unit to selectively operate a single hydraulically operated component in accordance with a second embodiment.

Referring now to FIG. 6, a bicycle component control apparatus 110 in accordance with a second embodiment will now be explained. In the bicycle component control apparatus 110, basically the bicycle suspension device 22 and the valve unit 24 has been removed, the hydraulic unit 16 is directly connected to the front derailleur 18, and an user operating device 12', an electric actuating unit 14' and a hydraulic unit 16' have been added to operate the rear derailleur 20. The user operating device 12', the electric actuating unit 14' and the hydraulic unit 16' are substantially identical to the user operating device 12, the electric actuating unit 14 and the hydraulic unit 16, discussed above. The hydraulic unit 16' is provided with a hydraulic fluid reservoir 74' for supply hydraulic fluid to the master cylinder in conventional manner.

In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment have been omitted for the sake of brevity.

Figure 7:
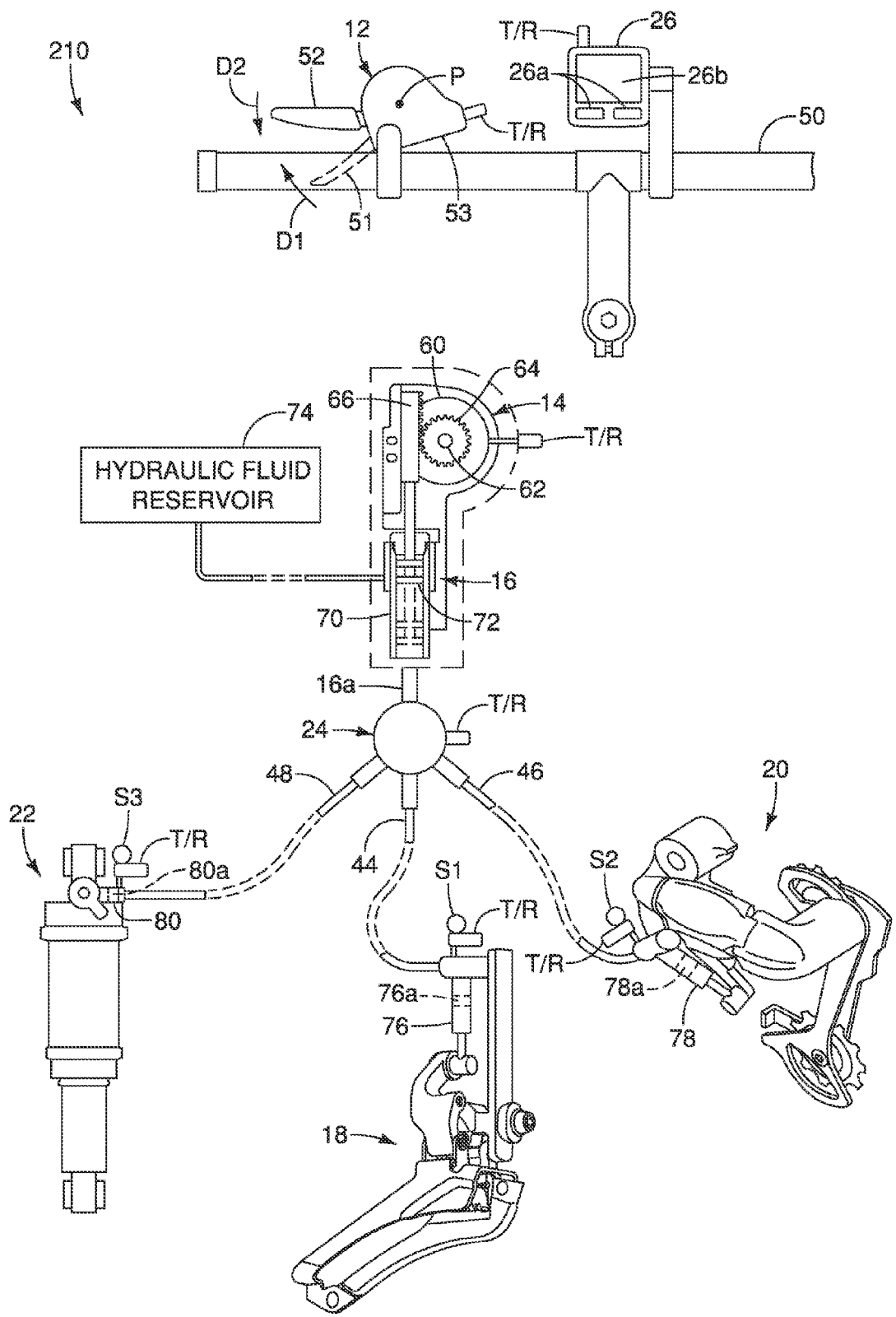
FIG. 7 is a schematic diagram of a wireless bicycle component control apparatus having a single control device for operating an electric actuating unit that actuates a hydraulic unit to selectively operate three hydraulically operated components using in an electrically controlled valve accordance with a third embodiment.

Referring now to FIG. 7, is a schematic diagram of a wireless bicycle component control apparatus 210 in accordance with a third embodiment will now be explained. Here, each component is provided with a wireless communication unit T/R that includes a wireless transmitter and a wireless receiver. Thus, the user operating device 12 is electrically connected to the electric actuating unit 14 by an electrical wireless connection. Likewise, the electric control unit 26 is electrically connected to the electric actuating unit 14, the valve unit 24 and the sensing elements S1, S2 and S3 by electrical wireless connections.

In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired on long as they do not substantially their intended function. Components that are shown directly connected or contacting each other can have intermediate structures disposed between them unless specifically stated otherwise. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle component control apparatus for controlling a plurality of bicycle components, the bicycle component control apparatus comprising:
   a user operating device that is a single device;
   an electric actuating unit controlled in response to operation of the user operating device to selectively control the plurality of bicycle components;
   an electric control unit configured to be operable by the user independently from the user operating device;
   an electrically controlled valve configured to be connected to the electric control unit and controlled by user operation of the electric control unit, the electrically controlled valve further being configured to be attached to the plurality of bicycle components, the electrically controlled valve having a plurality of component operating positions each corresponding to one of the plurality of bicycle components to alternatively select one of the plurality of bicycle components to be operated, the component operating positions of the valve being set by the electric control unit in response to user operation of the electric control unit; and
   a hydraulic unit configured to be simultaneously attached to the plurality bicycle components by the electrically controlled valve and fluidly connected to the plurality of bicycle components based on a selected one of the plurality of component operating positions, the hydraulic unit fluidly controlling one of the plurality of bicycle components corresponding to the selected one of the plurality of operating positions in response to actuation of the electric actuating unit by the user operating device.

2. The bicycle component control apparatus according to claim 1, wherein
   the user operating device is electrically connected to the electric actuating unit by an electrical wire.

3. The bicycle component control apparatus according to claim 1, wherein
   the user operating device is electrically connected to the electric actuating unit by an electrical wireless connection.

4. The bicycle component control apparatus according to claim 1, wherein
   the hydraulic unit includes a master piston moving in response to actuation of the electric actuating unit.

5. The bicycle component control apparatus according to claim 4, further comprising
   a plurality of slave pistons moving in response to movement of the master piston.

6. The bicycle component control apparatus according to claim 5, wherein
   the slave pistons are configured to be arranged at the plurality of bicycle components.

7. The bicycle component control apparatus according to claim 5, wherein
   the electric actuating unit includes an electric motor having an output shaft, and
   the master piston of the hydraulic unit is connected to the output shaft so that the master piston moves in response to rotation of the output shaft.

8. The bicycle component control apparatus according to claim 6, wherein the plurality of bicycle components includes a front derailleur, a rear derailleur and a bicycle suspension device.

9. The bicycle component control apparatus according to claim 1, wherein
the plurality of bicycle components includes at least two of a front derailleur, a rear derailleur and a bicycle suspension device.

10. The bicycle component control apparatus according to claim 1, further comprising
a plurality of sensing elements arranged to detect current positions of the plurality of bicycle components, respectively.

11. The bicycle component control apparatus according to claim 10, further comprising
a display operatively coupled to the sensing elements to receive a detection signal from each of the sensing elements and configured to display the current position of the plurality of bicycle components.

12. The bicycle component control apparatus according to claim 1, wherein
the electric control unit is configured to be mounted to a bicycle at a location offset from the user operating device.

13. The bicycle component control apparatus according to claim 1, further comprising
at least one bicycle component configured to be connected to the electrically controlled valve that is configured to be controlled by operating the electric control unit.

14. The bicycle component control apparatus according to claim 1, wherein
the electric control unit is configured to receive data from the electric actuating unit to enable the user to operate the electrically controlled valve.

* * * * *